(12) United States Patent
Suzuki

(10) Patent No.: US 11,713,770 B2
(45) Date of Patent: Aug. 1, 2023

(54) CENTRIFUGAL BLOWER

(71) Applicant: DENSO CORPORATION, Kariya (JP)

(72) Inventor: Yoshihiro Suzuki, Kariya (JP)

(73) Assignee: DENSO CORPORATION, Kariya (JP)

(*) Notice: Subject to any disclaimer, the term of this patent is extended or adjusted under 35 U.S.C. 154(b) by 206 days.

(21) Appl. No.: 17/362,332

(22) Filed: Jun. 29, 2021

(65) Prior Publication Data

US 2021/0324872 A1 Oct. 21, 2021

Related U.S. Application Data

(63) Continuation of application No. PCT/JP2019/045465, filed on Nov. 20, 2019.

(30) Foreign Application Priority Data

Jan. 7, 2019 (JP) .................................. 2019-000795

(51) Int. Cl.
| | |
|---|---|
| *F04D 29/28* | (2006.01) |
| *F04D 29/30* | (2006.01) |
| *F04D 29/42* | (2006.01) |
| *F04D 29/44* | (2006.01) |

(52) U.S. Cl.
CPC ........... *F04D 29/30* (2013.01); *F04D 29/281* (2013.01); *F04D 29/4213* (2013.01); *F04D 29/4226* (2013.01); *F04D 29/441* (2013.01)

(58) Field of Classification Search
CPC ... F04D 29/281; F04D 29/4213; F04D 29/441
See application file for complete search history.

(56) References Cited

FOREIGN PATENT DOCUMENTS

| | | | | |
|---|---|---|---|---|
| EP | 3530955 A1 | 8/2019 | | |
| JP | 2018035791 A | 3/2018 | | |
| JP | 2018035792 A | * 3/2018 | ............... | B60H 1/00 |
| JP | 2018091274 A | * 6/2018 | | |
| WO | WO-2018043640 A1 | 3/2018 | | |
| WO | WO-2018074339 A1 | * 4/2018 | ............... | B60H 1/00 |

* cited by examiner

*Primary Examiner* — Sabbir Hasan
(74) *Attorney, Agent, or Firm* — Harness, Dickey & Pierce, P.L.C.

(57) ABSTRACT

An upstream space forming portion of a centrifugal blower has a space division portion that divides an upstream space into an inner connection space and an outer connection space. The outer connection space has an overlapping space that overlaps the space division portion in an axial direction, and a non-overlapping space excluding the overlapping space from the outer connection space. A suction port has an outer overlapping portion located outside the separation cylinder in a radial direction, and an outer non-overlapping portion excluding the outer overlapping portion from the separation cylinder located outside in the radial direction. A relationship S1/S2≥0.5 is satisfied when a first area S1 is defined by projecting a boundary between the overlapping space and the non-overlapping space in the radial direction, and a second area S2 is defined by projecting the outer overlapping portion in the axial direction.

7 Claims, 7 Drawing Sheets

CENTRIFUGAL BLOWER

CROSS REFERENCE TO RELATED APPLICATIONS

The present application is a continuation application of International Patent Application No. PCT/JP2019/045465 filed on Nov. 20, 2019, which designated the U.S. and claims the benefit of priority from Japanese Patent Application No. 2019-000795 filed on Jan. 7, 2019. The entire disclosures of all of the above applications are incorporated herein by reference.

TECHNICAL FIELD

The present disclosure relates to a centrifugal blower.

BACKGROUND

A centrifugal blower includes a centrifugal fan having blades to rotate around a fan axis, and a separation cylinder arranged inside the blades in the radial direction of the centrifugal fan.

SUMMARY

According to one aspect of the present disclosure, a centrifugal blower includes: a centrifugal fan having blades arranged around a fan axis to rotate around the fan axis so as to suck air from one side in an axial direction and blow outward in a radial direction; a fan casing that houses the centrifugal fan, the fan casing having a suction port arranged on the one side of the centrifugal fan in the axial direction, air passing through the suction port to be sucked into the centrifugal fan; a separation cylinder arranged inside the blades in the radial direction, the separation cylinder having a cylindrical shape extending in the axial direction through the suction port; and an upstream space forming portion provided upstream of the suction port in a flow of air flow, in which an upstream space is formed for air flowing toward the suction port. The separation cylinder separates and guides the air passing through the suction port and heading between the blades into an inner air flowing inside the separation cylinder in the radial direction and an outer air flowing outside the separation cylinder in the radial direction. The upstream space forming portion has a space division portion that divides the upstream space into an inner connection space through which the inner air flows and an outer connection space through which the outer air flows. The inner connection space is biased on one side in one radial direction, which is one of the radial direction, in the upstream space. The outer connection space has an overlapping space that overlaps the space division portion at the other side opposite to the one side in the axial direction, and a non-overlapping space excluding the overlapping space from the outer connection space. The non-overlapping space is located on the other side opposite to the one side in the one radial direction relative to the inner connection space and the overlapping space. The suction port has an outer overlapping portion located outside the separation cylinder in the radial direction and overlapping the other side of the space division portion in the axial direction, and an outer non-overlapping portion excluding the outer overlapping portion from the suction port located outside the separation cylinder in the radial direction. The non-overlapping space is connected to the outer non-overlapping portion and is connected to the outer overlapping portion via the overlapping space.

DESCRIPTION OF EMBODIMENT

Figure 1:
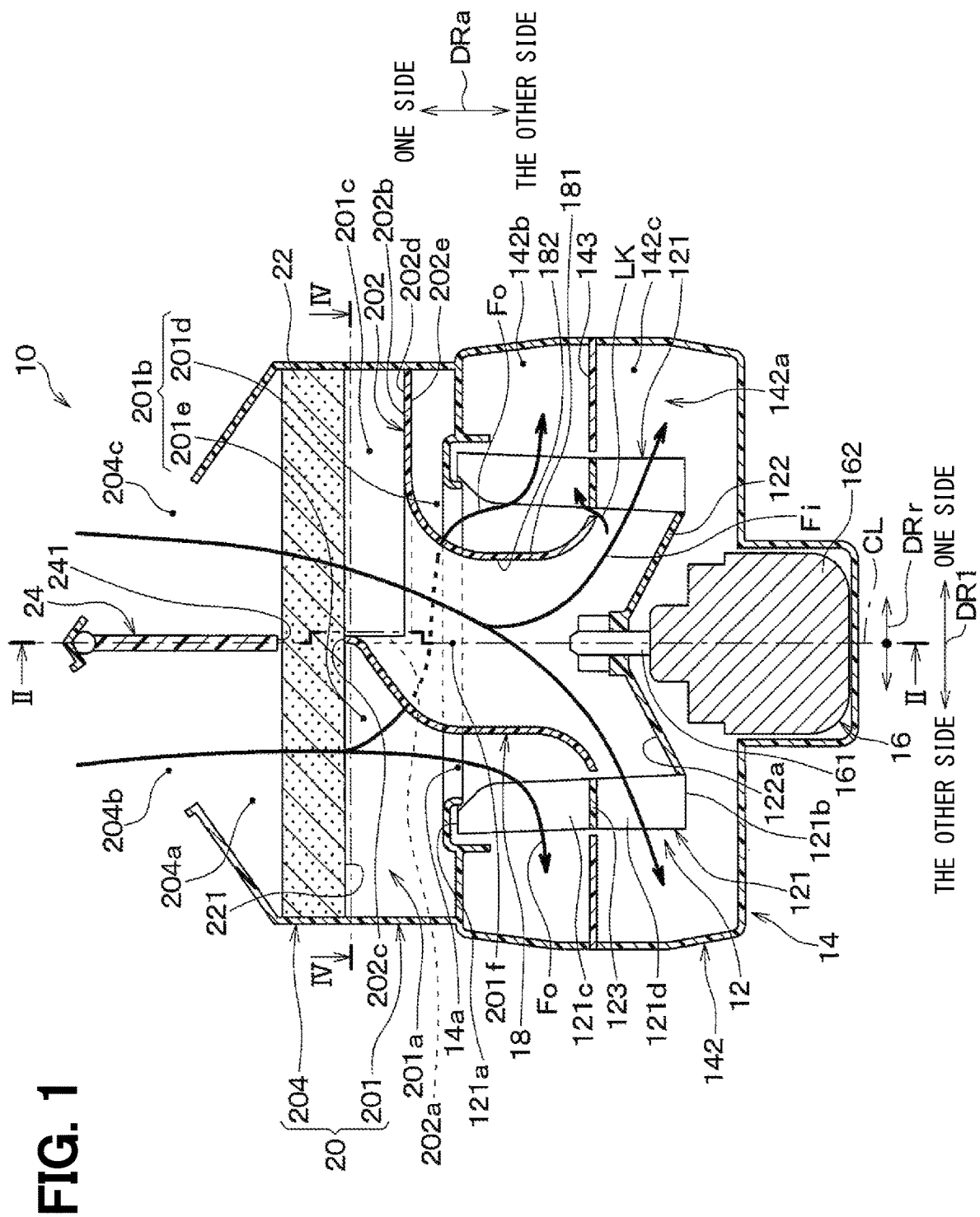
FIG. 1 is a cross-sectional view showing a schematic configuration of a centrifugal blower according to a first embodiment, taken along a plane including a fan axis of the centrifugal blower.

To begin with, examples of relevant techniques will be described.

A centrifugal blower is applied to an air conditioner for a vehicle, in which inside air and outside air flow as two-layer. The centrifugal blower can suck in two separated air flows at the same time from one side in the axial direction. The centrifugal blower includes a centrifugal fan having blades rotating around a fan axis, and a separation cylinder arranged inside the centrifugal fan in the radial direction with respect to the blades.

Further, the centrifugal blower has a scroll casing for housing the centrifugal fan. The scroll casing has a suction port through which air passes to be sucked into the centrifugal fan. The separation cylinder separates the air passing through the suction port into an outer air flowing on the radially outside of the separation cylinder and an inner air flowing on the radially inside of the separation cylinder.

In the centrifugal blower, the outer air is sucked into the centrifugal fan through an outer portion of the suction port in the radial direction of the separation cylinder. The radially outer portion of the suction port is formed over the entire circumference around the separation cylinder. Therefore, on the upstream side of the suction port in the air flow, a part of the outer air flows around an intervening space between a space where the inner air flows toward the suction port and the suction port. The outer air flows into the suction port from the intervening space.

The inventor studies the flow of outer air in a flow path where a part of the outer air flows around the intervening space before flowing into the suction port, and finds how to make the air easily flows in the flow path.

The present disclosure provides a centrifugal blower, in which the air passing through the suction port is separated between the outer side and the inner side of the separation cylinder in the radial direction, to reduce the pressure loss when the outer air is sucked into the suction port.

According to one aspect of the present disclosure, a centrifugal blower includes: a centrifugal fan having blades arranged around a fan axis to rotate around the fan axis so as to suck air from one side in an axial direction and blow outward in a radial direction; a fan casing that houses the centrifugal fan, the fan casing having a suction port arranged on the one side of the centrifugal fan in the axial direction, air passing through the suction port to be sucked into the centrifugal fan; a separation cylinder arranged inside the blades in the radial direction, the separation cylinder having a cylindrical shape extending in the axial direction through the suction port; and an upstream space forming portion provided upstream of the suction port in a flow of air flow, in which an upstream space is formed for air flowing toward the suction port. The separation cylinder separates and guides the air passing through the suction port and heading between the blades into an inner air flowing inside the separation cylinder in the radial direction and an outer air flowing outside the separation cylinder in the radial direction. The upstream space forming portion has a space division portion that divides the upstream space into an inner connection space through which the inner air flows and an outer connection space through which the outer air flows. The inner connection space is located to be biased on one side in one radial direction, which is one of the radial direction, in the upstream space. The outer connection space has an overlapping space that overlaps the space division portion at the other side opposite to the one side in the axial direction, and a non-overlapping space excluding the overlapping space from the outer connection space. The non-overlapping space is located on the other side opposite to the one side in the one radial direction relative to the inner connection space and the overlapping space. The suction port has an outer overlapping portion located outside the separation cylinder in the radial direction and overlapping the other side of the space division portion in the axial direction, and an outer non-overlapping portion excluding the outer overlapping portion from the suction portion located outside the separation cylinder in the radial direction. The non-overlapping space is connected to the outer non-overlapping portion and is connected to the outer overlapping portion via the overlapping space. When a first area defined by projecting a boundary between the overlapping space and the non-overlapping space in the one radial direction is set as S1, and a second area defined by projecting the outer overlapping portion of the suction port in the axial direction is set as S2, a relationship $S1/S2 \geq 0.5$ is satisfied.

In this way, the cross-sectional area of the boundary does not become extremely smaller than the cross-sectional area of the outer overlapping portion in an air flow path where the outer air flows from the non-overlapping space through the overlapping space to the outer overlapping portion of the suction port. That is, when the outer air flows from the non-overlapping space through the overlapping space to the outer overlapping portion of the suction port, the flow of the outer air is not so throttled at the boundary. Therefore, the outer air flowing into the overlapping space from the non-overlapping space can be easily distributed evenly to the overlapping space distant from the non-overlapping space. The outer overlapping portion can appropriately suck the outer air. As a result, it is possible to reduce the pressure loss when the outer air is sucked into the suction port, and to allow the outer air to flow smoothly.

According to another aspect of the present disclosure, a centrifugal blower includes: a centrifugal fan having blades arranged around a fan axis to rotate around the fan axis so as to suck air from one side in an axial direction and blow outward in a radial direction; a fan casing that houses the centrifugal fan, the fan casing having a suction port arranged on the one side of the centrifugal fan in the axial direction, air passing through the suction port to be sucked into the centrifugal fan; a separation cylinder arranged inside the blades in the radial direction, the separation cylinder having a cylindrical shape extending in the axial direction through the suction port; and an upstream space forming portion provided upstream of the suction port in a flow of air flow, in which an upstream space is formed for air flowing toward the suction port. The separation cylinder separates and guides the air passing through the suction port and heading between the blades into an inner air flowing inside the separation cylinder in the radial direction and an outer air flowing outside the separation cylinder in the radial direction. The upstream space forming portion has a space division portion that divides the upstream space into an inner connection space through which the inner air flows and an outer connection space through which the outer air flows. The inner connection space is located to be biased on one side in one radial direction, which is one of the radial direction, in the upstream space. The outer connection space has an overlapping space that overlaps the space division portion at the other side opposite to the one side in the axial direction, and a non-overlapping space excluding the overlapping space from the outer connection space. The non-overlapping space is located on the other side opposite to the one side in the one radial direction relative to the inner connection space and the overlapping space. The suction port has an outer overlapping portion located outside the separation cylinder in the radial direction and overlapping the other side of the space division portion in the axial direction, and an outer non-overlapping portion excluding the outer overlapping portion from the suction portion located outside the separation cylinder in the radial direction. The non-overlapping space is connected to the outer non-overlapping portion and is connected to the outer overlapping portion via the overlapping space. In a projected shape in which a boundary between the overlapping space and the non-overlapping space is projected in the one radial direction, a connection portion of the boundary connected to the suction port has a connection width in an orthogonal direction orthogonal to the one radial direction and the axial direction, and the connection width is smaller than a non-connection width obtained by subtracting the connection width from a width of the projected shape in the orthogonal direction.

The outer air flowing from the non-overlapping space to the overlapping space through a region of the boundary having the connection width in the orthogonal direction is immediately sucked into the suction port when entering the overlapping space from the boundary. On the other hand, the outer air flowing from the non-overlapping space to the overlapping space through a region of the boundary having the non-connection width in the orthogonal direction easily spreads to a part of the overlapping space away from the non-overlapping space.

Therefore, it is possible to reduce the bias of the outer air, which is sucked into the outer overlapping portion of the suction port, toward the outer non-overlapping portion by setting the magnitude relationship between the connection width and the non-connection width as described above. As a result, it is possible to reduce the pressure loss when the outer air is sucked into the suction port, and to allow the outer air to flow smoothly.

The reference numerals attached to the components and the like indicate an example of correspondence between the components and the like and specific components and the like in embodiments described below.

Embodiments are described below with reference to the drawings. In the following embodiments, identical or equivalent elements are denoted by the same reference numerals as each other in the figures.

First Embodiment

A centrifugal blower 10 of the present embodiment illustrated in FIG. 1 is applied to an inside/outside air two-layer flow type air conditioner for a vehicle. The air conditioner can simultaneously draw in air in the cabin (that is, inside air) and air outside the cabin (that is, outside air) in separated manner. In the following description, the centrifugal blower 10 is simply referred to as blower 10.

Figure 2:
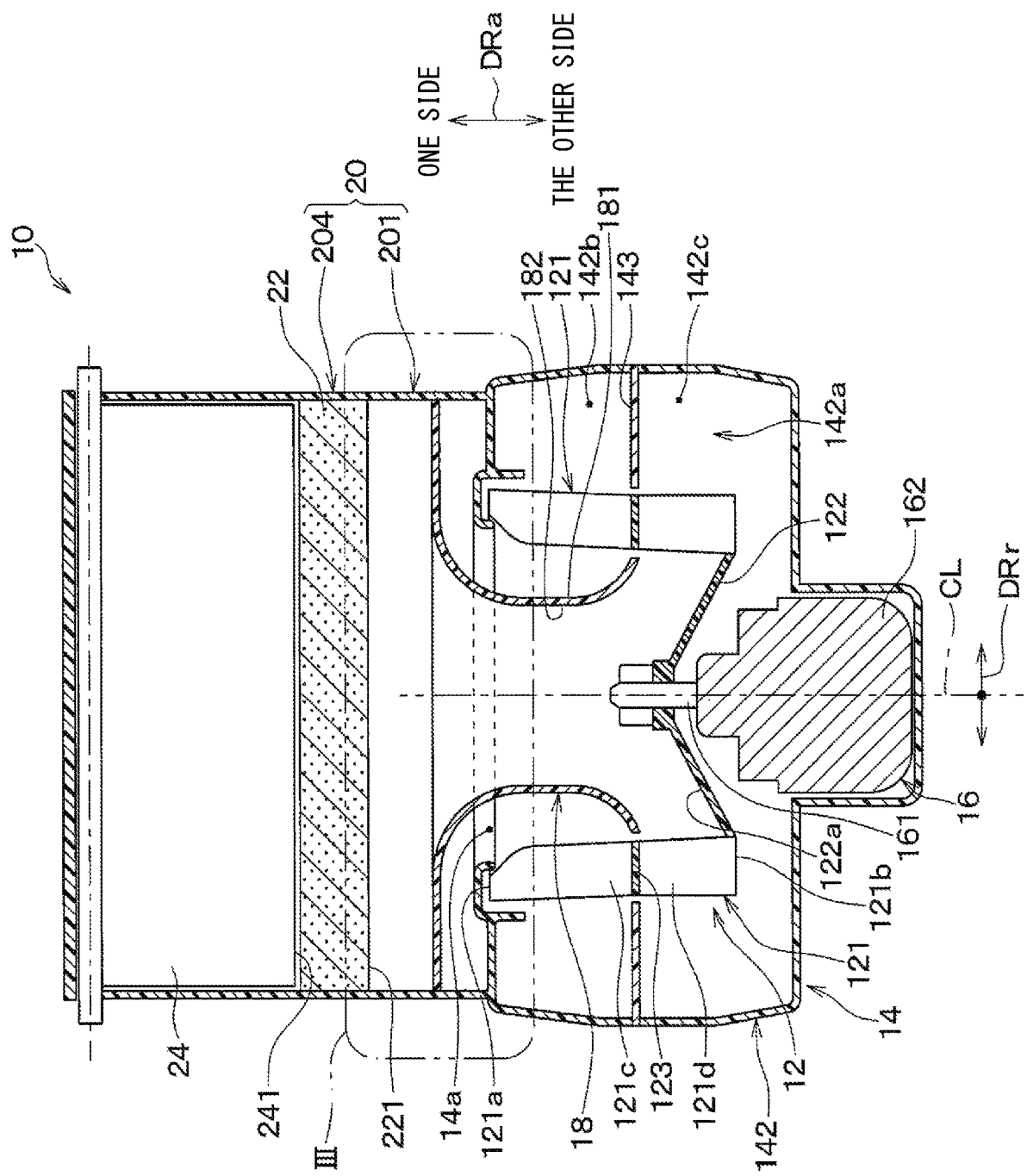
FIG. 2 is a cross-sectional view taken along a line II-II in FIG. 1.

As shown in FIGS. 1 and 2, the blower 10 includes a centrifugal fan 12, a fan casing 14, a motor 16, a separation cylinder 18, an upstream casing 20, a filter 22, and an inside/outside air door 24. The centrifugal fan 12 rotates around the fan axis CL. The centrifugal fan 12 rotates around the fan axis CL to blow out the air sucked from one side in the axial direction DRa of the fan axis CL outward in the radial direction DRr of the centrifugal fan 12.

FIGS. 1 and 2 show a vertical cross section of the centrifugal fan 12, the fan casing 14, the separation cylinder 18, and the upstream casing 20 of the blower 10 taken along a plane including the fan axis CL.

In the present embodiment, the axial direction DRa of the fan axis CL, that is, the axial direction DRa of the centrifugal fan 12 will be referred to as axial direction DRa. The radial direction DRr of the fan axis CL, that is, the radial direction DRr of the centrifugal fan 12 will be referred to as radial direction DRr. The radial direction DRr is perpendicular to the axial direction DRa.

The centrifugal fan 12 has blades 121, a main plate 122, and a separation plate 123. The blades 121 are arranged side by side around the fan axis CL. Each of the blades 121 has one end 121a that is an end on one side in the axial direction DRa and the other end 121b that is an end on the other side in the axial direction DRa.

The main plate 122 has a plate shape that extends in the radial direction DRr. In short, the main plate 122 has a disk shape centered on the fan axis CL. The main plate 122 is arranged on the other side of the separation cylinder 18 in the axial direction DRa. The rotation shaft 161 of the motor 16 is connected to the central portion of the main plate 122 so as not to rotate relative to each other. The other end 121b of each of the blades 121 is fixed to an outer portion of the main plate 122 in the radial direction DRr.

Further, the main plate 122 has a main plate guide surface 122a on one side in the axial direction DRa. The main plate guide surface 122a faces the one side in the axial direction DRa and extends in the radial direction DRr.

The separation plate 123 separates the air flowing between the blades 121 into air flowing on the one side of the separation plate 123 in the axial direction DRa and air flowing on the other side of the separation plate 123 in the axial direction DRa.

Specifically, the separation plate 123 intersects each of the blades 121 and extends in an annular shape about the fan axis CL. The separation plate 123 has a plate shape that extends in the radial direction DRr. For example, the separation plate 123 has a flat plate shape with the axial direction DRa as the normal direction.

Each of the blades 121 and the separation plate 123 are fixed to each other at a position where the blade 121 and the separation plate 123 intersect. In the present embodiment, the blades 121, the main plate 122, and the separation plate 123 are integrally formed as an integrally molded product made of resin.

The separation plate 123 divides each of the blades 121 into one side portion 121c and the other side portion 121d arranged in the axial direction DRa. That is, the one side portion 121c is provided on the one side of the separation plate 123 in the axial direction DRa, and the other side portion 121d is provided on the other side of the separation plate 123 in the axial direction DRa.

In the present embodiment, the airfoil of the one side portion 121c and the airfoil of the other side portion 121d are airfoil of the sirocco fan.

Figure 3:
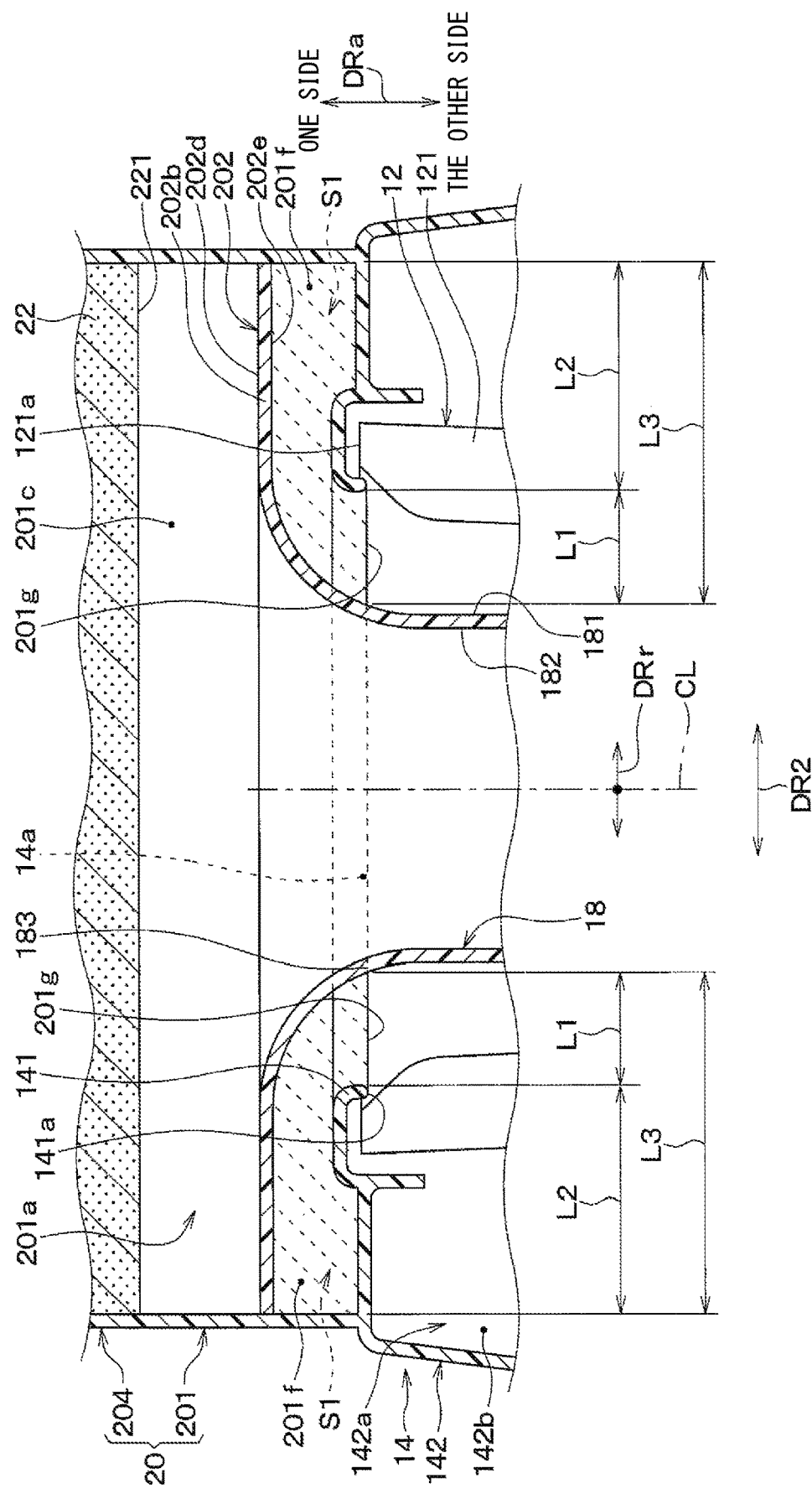
FIG. 3 is an enlarged view showing an area III of FIG. 2.

The fan casing 14 and the upstream casing 20 function as a housing that constitutes the outer shell of the blower 10. The fan casing 14 houses the centrifugal fan 12 inside the fan casing 14. As shown in FIGS. 1 and 3, the fan casing 14 has a suction port 14a through which air sucked into the centrifugal fan 12 passes. The suction port 14a is arranged on the one side of the centrifugal fan 12 in the axial direction DRa. The suction port 14a is, for example, a circular opening centered on the fan axis CL.

The fan casing 14 has a bell mouth 141 as a peripheral edge around the suction port 14a. The bell mouth 141 surrounds the suction port 14a, and the suction port 14a is formed on the inner side of the bell mouth 141.

In the vertical cross section of the blower 10, the cross-sectional shape of the bell mouth 141 is arcuate so that air can smoothly flow into the suction port 14a. Further, the bell mouth 141 has the other end 141a on the other side in the axial direction DRa.

The fan casing 14 has an air passage forming portion 142 and a partition plate 143. The air passage forming portion 142 forms a blown air passage 142a provided outside the centrifugal fan 12 in the radial direction DRr. The air blown out from the centrifugal fan 12 collects and flows in the blown air passage 142a. For example, the blown air passage 142a is formed in a spiral shape around the centrifugal fan 12. The fan casing 14 is also called a scroll casing.

The partition plate 143 is provided inside the blown air passage 142a. That is, the partition plate 143 is arranged outside the centrifugal fan 12 in the radial direction DRr. The partition plate 143 partitions the blown air passage 142a into a first air passage 142b arranged on the one side of the partition plate 143 in the axial direction DRa and a second air passage 142c arranged on the other side of the partition plate 143 in the axial direction DRa.

The partition plate 143 is a flat plate extending in the radial direction DRr with the axial direction DRa as the normal direction. The partition plate 143 is connected to the air passage forming portion 142 at the outer end of the partition plate 143 in the radial direction. Further, the partition plate 143 is arranged so that the position of the partition plate 143 and the position of the separation plate 123 are aligned with each other in the axial direction DRa. In the present embodiment, the air passage forming portion 142 and the partition plate 143 are integrally formed as an integrally molded article made of resin. The thickness of the partition plate 143, the thickness of the separation plate 123, and the thickness of the separation cylinder 18 are, for example, the same or substantially the same.

The motor 16 is an electric drive device rotating the centrifugal fan 12. The motor 16 has a rotation shaft 161 and a main body 162. The rotation shaft 161 extends toward the one side in the axial direction DRa from the main body 162. The rotation shaft 161 rotates and thus the centrifugal fan 12 rotates. The main body 162 is fixed to the fan casing 14. The main body 162, the fan casing 14, the separation cylinder 18, and the upstream casing 20 are non-rotating members that do not rotate.

The separation cylinder 18 is arranged inside the bell mouth 141 and the blades 121 of the centrifugal fan 12 in the radial direction DRr. The separation cylinder 18 has a tubular shape that extends in the axial direction DRa and passes through the suction port 14a (that is, the inner side of the bell mouth 141 in the radial direction). For example, the separation cylinder 18 has a cylindrical shape in which the cross-sectional shape taken along a virtual plane orthogonal to the fan axis CL forms a circular shape on the other side of the suction port 14a in the axial direction DRa. The separation cylinder 18 is arranged by inserting a part of the separation cylinder 18 into the fan casing 14 through the suction port 14a. The separation cylinder 18 is fixed to, for example, the space division portion 202 of the upstream casing 20.

Due to such a shape and arrangement, the separation cylinder 18 separates the air passing through the suction port 14a toward the centrifugal fan 12 into two flows of air. More specifically, the separation cylinder 18 separates and guides the suction air that passes through the suction port 14a into an inner air and an outer air to head between the blades 121 of the centrifugal fan 12. The inner air is the suction air that flows inside the separation cylinder 18 in the radial direction DRr. The outer air is the suction air that flows outside the separation cylinder 18 in the radial direction DRr. In FIG. 1, the flow of the outer air is represented by Fo, and the flow of the inner air is represented by Fi.

The separation cylinder 18 has a shape extended in the radial direction DRr as going toward the other side in the axial direction DRa in order to guide the inner air and the outer air between the blades 121. That is, on the other side of the separation cylinder 18 in the axial direction DRa, the diameter of the separation cylinder 18 increases from the one side toward the other end in the axial direction DRa. For example, the separation cylinder 18 has a shape that expands outward in the radial direction DRr with respect to the axial direction DRa at the end position of the separation cylinder 18 on the other side in the axial direction DRa.

The other end of the separation cylinder 18 is aligned in position with the radially inner end of the separation plate 123 in the axial direction DRa. The other end of the separation cylinder 18 in the axial direction DRa is arranged close to the blades 121 of the centrifugal fan 12 so as not to come into contact with each other.

Since the separation cylinder 18 has a tubular shape as described above, the separation cylinder 18 has a separation cylinder outer surface 181 formed as the outer wall surface of the cylinder shape and a separation cylinder inner surface 182 formed as the inner wall surface of the cylinder shape.

The main plate guide surface 122a guides the inner air Fi to flow outward in the radial direction DRr at the upstream side of the blades 121 in the air flow.

As shown in FIG. 1, the separation plate 123 of the centrifugal fan 12 is arranged to separate the flow of the outer air Fo and the flow of the inner air Fi in the axial direction DRa, at the downstream side of the separation cylinder 18 in the air flow. That is, the separation plate 123 is arranged such that the outer air flows on the one side of the separation plate 123 in the axial direction DRa and the inner air flows on the other side of the separation plate 123 in the axial direction DRa, between the blades 121.

The partition plate 143 of the fan casing 14 is arranged to separate the flow of the outer air Fo and the flow of the inner air Fi in the axial direction DRa on the downstream side of the centrifugal fan 12 in the air flow. That is, the partition plate 143 is arranged so that the outer air Fo flows from the centrifugal fan 12 into the first air passage 142b and the inner air Fi flows into the second air passage 142c.

In short, the separation plate 123 and the partition plate 143 are arranged so as to restrict the outer air and the inner air from mixing with each other on the downstream side of the separation cylinder 18 in the air flow.

As shown in FIG. 1, there is a gap between the separation plate 123 and the separation cylinder 18 and there is a gap between the separation plate 123 and the partition plate 143 to allow relative rotation. Therefore, between the blades 121, much more outer air flows on the one side of the separation plate 123 in the axial direction DRa than the inner air, and much more inner air flows on the other side of the separation plate 123 in the axial direction DRa than the outer air. Then, much more outer air flows from the centrifugal fan 12 into the first air passage 142b than the inner air, and much more inner air flows into the second air passage 142c than the outer air.

The upstream casing 20 has the upstream space forming portion 201 connected to the fan casing 14 on the one side in the axial direction DRa, and a filter housing 204 connected to the upstream space forming portion 201 on the one side in the axial direction DRa. The upstream space forming portion 201 and the filter housing 204 are, for example, integrally formed.

As shown in FIGS. 1 and 3, the upstream space forming portion 201 is provided on the upstream side of the suction port 14a of the fan casing 14 in the air flow. An upstream space 201a is formed inside the upstream space forming portion 201, through which air flows toward the suction port 14a. The upstream space forming portion 201 has a space division portion 202 that partitions the upstream space 201a. Specifically, the space division portion 202 divides the upstream space 201a into an outer connection space 201b through which the outer air flows and an inner connection space 201c through which the inner air flows.

The inner connection space 201c is biased to one side in one radial direction DR1 which is one of the radial direction DRr, in the upstream space 201a. Further, the inner connection space 201c is biased on the one side in the axial direction DRa in the upstream space 201a. In the following description, the one radial direction DR1 may be referred to as first radial direction DR1. Further, an orthogonal direction orthogonal to the first radial direction DR1 and the axial direction DRa is referred to as second radial direction DR2.

Figure 4:
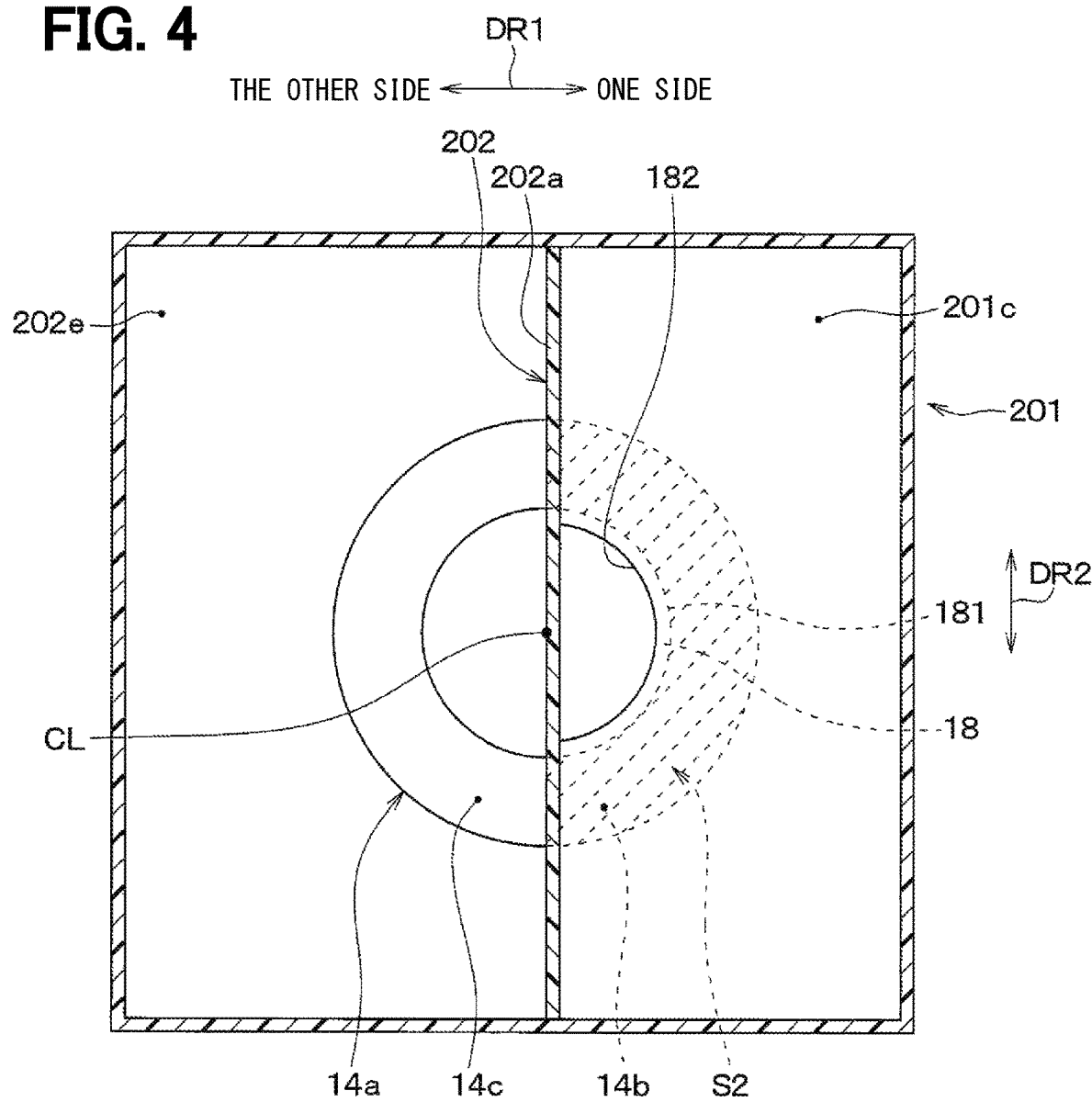
FIG. 4 is a cross-sectional view taken along a line IV-IV in FIG. 1.

As shown in FIGS. 3 and 4, the inner connection space 201c is formed over the entire width of the upstream space forming portion 201 in the second radial direction DR2.

As shown in FIGS. 1 and 4, the outer connection space 201b has an overlapping space 201d and a non-overlapping space 201e connected to each other. In other words, the overlapping space 201d and the non-overlapping space 201e are connected to each other at the boundary 201f between the overlapping space 201d and the non-overlapping space 201e to form one outer connection space 201b.

The overlapping space 201d is a part of the outer connection space 201b that overlaps the space division portion 202 on the other side in the axial direction DRa. The non-overlapping space 201e is a part of the outer connection space 201b excluding the overlapping space 201d and arranged on the other side of the inner connection space 201c and the overlapping space 201d in the first radial direction DR1.

Further, the space division portion 202 has a first partition wall 202a arranged between the non-overlapping space 201e and the inner connection space 201c, and a second partition wall 202b arranged between the overlapping space 201d and the inner connection space 201c. The first partition wall 202a separates the non-overlapping space 201e and the inner connection space 201c in the first radial direction DR1. The second partition wall 202b separates the overlapping space 201d and the inner connection space 201c in the axial direction DRa. The first partition wall 202a has one end 202c provided on the one side in the axial direction DRa.

Further, the space division portion 202 has one side surface 202d facing the inner connection space 201c on the one side in the axial direction DRa, and the other side surface 202e facing the overlapping space 201d on the other side in the axial direction DRa. Both the one side surface 202d and the other side surface 202e are included in the second partition wall 202b of the space division portion 202.

The suction port 14a of the fan casing 14 has an outer overlapping portion 14b and an outer non-overlapping portion 14c. The outer overlapping portion 14b is a part of the suction port 14a that overlaps the space division portion 202 on the other side in the axial direction DRa and is located outside the separation cylinder 18 in the radial direction DRr. The outer non-overlapping portion 14c is a part of the suction port 14a excluding the outer overlapping portion 14b from an annular outer portion located outside the separation cylinder 18 in the radial direction DRr. For example, in the present embodiment, the outer overlapping portion 14b occupies approximately half of the outer portion of the suction port 14a located outside the separation cylinder 18.

Due to such configurations of the suction port 14a and the outer connection space 201b, the non-overlapping space 201e of the outer connection space 201b is directly connected to the outer non-overlapping portion 14c of the suction port 14a, and the overlapping space 201d is directly connected to the outer overlapping portion 14b of the suction port 14a. Therefore, the non-overlapping space 201e is connected to the outer overlapping portion 14b of the suction port 14a via the overlapping space 201d.

As shown in FIGS. 1 and 3, the filter housing 204 of the upstream casing 20 is provided on the upstream side of the upstream space forming portion 201 in the air flow. The filter 22 is arranged inside the filter housing 204, and is configured to be breathable to filter the air sucked into the centrifugal fan 12. Therefore, the filter 22 is arranged on the upstream side of the upstream space 201a of the upstream space forming portion 201 in the air flow.

Further, the filter 22 has, for example, a rectangular parallelepiped shape, and has a filter downstream surface 221 as an outflow surface through which air passing through the filter 22 flows out. The filter downstream surface 221 faces the other side in the axial direction DRa. The filter downstream surface 221 faces the non-overlapping space 201e and the inner connection space 201c from the one side in the axial direction DRa.

Further, the one side of the filter housing 204 in the axial direction DRa is the upstream side of the filter 22 in the air flow. The filter upstream space 204a is formed on the one side of the filter 22 in the axial direction DRa.

The inside/outside air door 24 is arranged in the filter upstream space 204a, and the inside/outside air door 24 rotates in the filter upstream space 204a. Further, an outside air inlet 204b and an inside air inlet 204c are formed as through holes in a part of the filter housing 204 facing the filter upstream space 204a. The outside air inlet 204b is an inflow port for introducing the outside air into the filter upstream space 204a. The outside air inlet 204b communicates with outside of the cabin, and is arranged on the other side of rotation center of the inside/outside air door 24 in the first radial direction DR1. Further, the inside air inlet 204c is an inflow port for introducing the inside air into the filter upstream space 204a. The inside air inlet 204c communicates with the cabin, and is arranged on the one side of the rotation center of the inside/outside air door 24 in the first radial direction DR1.

The inside/outside air door 24 opens and closes the outside air inlet 204b and the inside air inlet 204c as the inside/outside air door 24 rotates. For example, the inside/outside air door 24 is positioned at an outside air introduction position that opens the outside air inlet 204b and closes the inside air inlet 204c, or an inside air introduction position that closes the outside air inlet 204b and opens the inside air inlet 204c. Further, the inside/outside air door 24 can be also positioned at the inside/outside air introduction position where both the outside air inlet 204b and the inside air inlet 204c are opened.

FIG. 1 shows a state in which the inside/outside air door 24 is positioned at the inside/outside air introduction position. At the inside/outside air introduction position, the tip end 241 of the inside/outside air door 24 on the side opposite to the rotation center of the inside/outside air door 24 faces the one end 202c of the first partition wall 202a in the axial direction DRa through the filter 22. At the same time, the inside/outside air door 24 divides the filter upstream space 204a into two spaces. One of the two spaces communicates exclusively with the outside air inlet 204b, and the other of the two spaces communicates exclusively with the inside air inlet 204c.

Therefore, in case where the inside/outside air door 24 is positioned at the inside/outside air introduction position, when the centrifugal fan 12 rotates, the outside air Fo flows and the inside air Fi flows as shown by arrows in FIG. 1. That is, the outside air flows in from the outside air inlet 204b, and most of the outside air flows to the non-overlapping space 201e in the outer connection space 201b via the filter 22. At the same time, the inside air flows in from the inside air inlet 204c, and most of the inside air flows to the inner connection space 201c through the filter 22.

Then, the outside air of the non-overlapping space 201e flows from the non-overlapping space 201e through the overlapping space 201d or directly to the suction port 14a as outer air. The outer air passes between the blades 121, and flows into the first air passage 142b of the fan casing 14. The inside air of the inner connection space 201c flows from the inner connection space 201c to the suction port 14a as inner air, passes between the blades 121, and flows to the second air passage 142c of the fan casing 14.

At this time, as shown in FIG. 1, inside the blower 10, the outer air Fo and the inner air Fi flow in the separated manner, due to the inside/outside air door 24, the space division portion 202, the separation cylinder 18, the separation plate 123, and the partition plate 143.

The air passage forming portion 142 of the blower 10 is connected to an air conditioning casing (not shown) of the air conditioner for a vehicle, and the air blown from the blower 10 flows in the air conditioning casing. A temperature regulator adjusting an air temperature is disposed in the air conditioning casing. The air blown out from the blower 10 is blown into the cabin after the temperature thereof is adjusted by the temperature regulator. Even inside the air conditioning casing, the state in which the flow of outer air and the flow of inner air are separated is maintained. Then, after the temperature of each of the two flows of is adjusted, the two flows are blown into the cabin, for example, from different outlets.

In case where the inside/outside air door 24 is positioned at the outside air introduction position, when the centrifugal fan 12 rotates, the outside air flows into the filter upstream space 204a from the outside air inlet 204b. At this time, the inside air inlet 204c is closed. The air (specifically, the outside air) that has flowed into the filter upstream space 204a flows through the filter 22 to the inner connection space 201c and the non-overlapping space 201e of the outer connection space 201b. The subsequent air flow is the same as when the inside/outside air door 24 is positioned at the inside/outside air introduction position.

In case where the inside/outside air door 24 is positioned at the inside air introduction position, when the centrifugal fan 12 rotates, the inside air flows into the filter upstream space 204a from the inside air inlet 204c. At this time, the outside air inlet 204b is blocked. The air (specifically, the inside air) that has flowed into the filter upstream space 204a flows through the filter 22 to the inner connection space 201c and the non-overlapping space 201e of the outer connection space 201b. The subsequent air flow is the same as when the inside/outside air door 24 is positioned at the inside/outside air introduction position.

Figure 5:
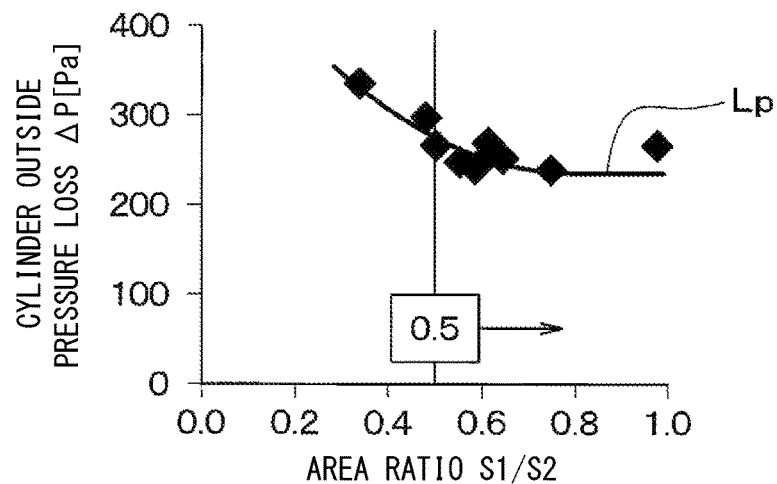
FIG. 5 is a graph showing a relationship between an area ratio S1/S2 and a cylinder outside pressure loss as experimental results using the centrifugal blower in the first embodiment.

FIG. 5 is a graph showing the relationship between the area ratio S1/S2 obtained by dividing the first area S1 by the second area S2 and the pressure loss ΔP outside the cylinder in the blower 10. The relationship in FIG. 5 represented by the curve Lp is based on experimental results in which the centrifugal fan 12 is operated at a predetermined rotation speed in the state where the inside/outside air door 24 is positioned at the inside/outside air introduction position. Further, the tendency shown by the curve Lp in FIG. 5 does not change even if the rotation speed of the centrifugal fan 12 is changed up and down with respect to the predetermined rotation speed.

The first area S1 is the total area of the regions hatched with broken lines in FIG. 3. More specifically, the area hatched with the broken line is divided into two areas, and the first area S1 is the total area of the two areas. That is, the first area S1 is a projected area obtained by projecting the boundary 201f between the overlapping space 201d and the non-overlapping space 201e in the first radial direction DR1. More specifically, the first area S1 is a projected area obtained by projecting the boundary 201f in the first radial direction DR1 with respect to a virtual plane having the first radial direction DR1 as the normal direction. As shown in FIG. 3, the area hatched with the broken line showing the first area S1 extends to the position of the other end 141a of the bell mouth 141 in the axial direction DRa.

The second area S2 is hatched with a broken line in FIG. 4. That is, the second area S2 is a projected area obtained by projecting the outer overlapping portion 14b of the suction port 14a in the axial direction DRa. More specifically, the second area S2 is a projected area obtained by projecting the outer overlapping portion 14b in the axial direction DRa with respect to a virtual plane having the axial direction DRa as the normal direction.

Further, the cylinder outside pressure loss ΔP is a pressure difference obtained by subtracting the average air pressure P2a of air in the outer portion of the suction port 14a outside the cylinder from the average air pressure P1a of air at the inlet 204b, 204c connected to the non-overlapping space 201e. In short, the pressure loss ΔP is calculated from the formula "ΔP=P1a−P2a". Specifically, of the two inlets 204b and 204c, the inflow port connected to the non-overlapping space 201e is the outside air inlet 204b since the inside/outside air door 24 is positioned at the inside/outside air introduction position. Further, the inflow port connected to the non-overlapping space 201e is the outside air inlet 204b when the inside/outside air door 24 is positioned at the outside air introduction position. The inflow port connected to the non-overlapping space 201e is the inside air inlet 204c when the inside/outside air door 24 is positioned at the inside air introduction position.

As shown in FIG. 5, it can be seen that the pressure loss ΔP can be suppressed to a small value when the relationship "S1/S2≥0.5" is satisfied from the relationship of the curve Lp. Therefore, in the blower 10 of the present embodiment, the relationship of "S1/S2≥0.5" is satisfied.

The experimental result of FIG. 5 shows the case where the blower 10 blows air in the inside/outside air two-layer mode in which the inside/outside air door 24 is positioned at the inside/outside air introduction position. The same result as in FIG. 5 is obtained when the blower 10 blows air in the inside air mode or when the blower 10 blows air in the outside air mode. The inside air mode is a suction mode in which the inside/outside air door 24 is positioned at the inside air introduction position. The outside air mode is a suction mode in which the inside/outside air door 24 is positioned at the outside air introduction position.

Further, as shown in FIG. 3, in the blower 10 of the present embodiment, the connection width L1 is smaller than the non-connection width L2 in a boundary projection shape in which the boundary 201f between the overlapping space 201d and the non-overlapping space 201e is projected in the first radial direction DR1. The connection width L1 is a width of the connection portion 201g of the boundary 201f connected to the suction port 14a in the second radial direction DR2 in the boundary projection shape. The non-connection width L2 is obtained by subtracting the connection width L1 from the width L3 of the boundary projection shape in the second radial direction DR2.

Further, the boundary projection shape is shown in FIG. 3 as the shape of the region subjected to the broken line hatching. In detail, the boundary projection shape is obtained by projecting the boundary 201f between the overlapping space 201d and the non-overlapping space 201e in the first radial direction DR1 with respect to the virtual plane whose normal direction is the first radial direction DR1.

In FIG. 3, the connection width L1 is shown as being divided into two, but the size of the connection width L1 is the sum of the widths divided into the two. This also applies to the sizes of the widths L2 and L3.

As shown in FIG. 4, when the suction port 14a and the upstream space 201a are viewed from the one side in the axial direction DRa, the outer overlapping portion 14b occupying approximately half of the outer portion of the suction port 14a outside the cylinder is covered by the space division portion 202. Therefore, the outer air is less likely to flow in the outer overlapping portion 14b compared with the outer non-overlapping portion 14c of the suction port 14a.

On the other hand, the relationship "S1/S2≥0.5" is satisfied. However, as shown in FIGS. 1, 3, and 4, S1 is the first area in which the boundary 201f between the overlapping space 201d and the non-overlapping space 201e is projected in the first radial direction DR1, and S2 is the second area in which the outer overlapping portion 14b of the suction port 14a is projected in the axial direction DRa.

Therefore, in the air flow path in which the outer air flows from the non-overlapping space 201e through the overlapping space 201d to the outer overlapping portion 14b of the suction port 14a, the cross-sectional area of the boundary 201f is not extremely smaller than that the outer overlapping portion 14b. That is, when the outer air flows from the non-overlapping space 201e through the overlapping space 201d into the outer overlapping portion 14b of the suction port 14a, the flow of the outer air is not so throttled at the boundary 201f. Therefore, the outer air flowing into the overlapping space 201d from the non-overlapping space 201e can easily spread evenly to a portion of the overlapping space 201d distant from the non-overlapping space 201e. The outer overlapping portion 14b can appropriately suck the outer air. As a result, it is possible to reduce the pressure loss when the outer air is sucked into the suction port 14a, and to allow the outer air to flow smoothly.

Further, FIG. 5 shows that the pressure loss when the outer air is sucked into the suction port 14a is reduced by establishing the relationship "S1/S2≥0.5".

When the pressure loss when the outer air is sucked into the suction port 14a is reduced in this way, it is possible to suck more outer air into the centrifugal fan 12 accordingly.

As shown in FIG. 1, in the inside/outside air two-layer mode, the outside air flowing into the filter upstream space 204a flows to the first air passage 142b as the outer air Fo. At the same time, the inside air that has flowed into the filter upstream space 204a flows into the second air passage 142c as the inner air Fi. In the present embodiment, since it is possible to suck a large amount of outside air into the centrifugal fan 12 by reducing the pressure loss, for example, the inside air is restricted from leaking to the flow path for the outside air, as shown by an arrow LK, through the gap between the separation cylinder 18 and the separation plate 123 of the centrifugal fan 12. That is, in the inside/outside air two-layer mode, it is possible to restrict the inside air from being mixed with the outside air flowing through the first air passage 142b.

As a result, for example, in the defroster mode of the air conditioner for a vehicle, it is possible to avoid a situation in which it becomes difficult to remove the fogging of the windshield due to the mixing of the inside air having relatively high humidity into the outside air having low humidity.

Further, according to the present embodiment, as shown in FIGS. 1 and 3, the connection width L1 is smaller than the non-connection width L2 in the boundary projection shape in which the boundary 201f between the overlapping space 201d and the non-overlapping space 201e is projected in the first radial direction DR1. In this regard, the connection width L1 is the width of the connection portion 201g of the boundary 201f connected to the suction port 14a in the second radial direction DR2 in the boundary projection shape. The non-connection width L2 is the width obtained by subtracting the connection width L1 from the width L3 of the boundary projection shape in the second radial direction DR2.

The outer air flowing from the non-overlapping space 201e to the overlapping space 201d through the region of the boundary 201f having the connection width L1 in the second radial direction DR2 is immediately sucked into the suction port 14a when entering the overlapping space 201d from the boundary 201f. On the other hand, the outer air flowing from the non-overlapping space 201e to the overlapping space 201d through the region of the boundary 201f having the non-connection width L2 in the second radial direction DR2 easily spreads to a part of the overlapping space 201d distant from the non-overlapping space 201e. Therefore, the outer air sucked into the outer overlapping portion 14b of the suction port 14a can be restricted from being biased toward the outer non-overlapping portion 14c by setting the magnitude relationship between the connection width L1 and the non-connection width L2 as "L1<L2". As a result, it is possible to reduce the pressure loss when the outer air is sucked into the suction port 14a, and to allow the outer air to flow smoothly.

Second Embodiment

A second embodiment is described next. The present embodiment will be explained with respect to portions different from those of the first embodiment. In addition, explanations of the same or equivalent portions as those in the above embodiment will be omitted or simplified. This also applies to the description of embodiment to be described later.

Figure 6:
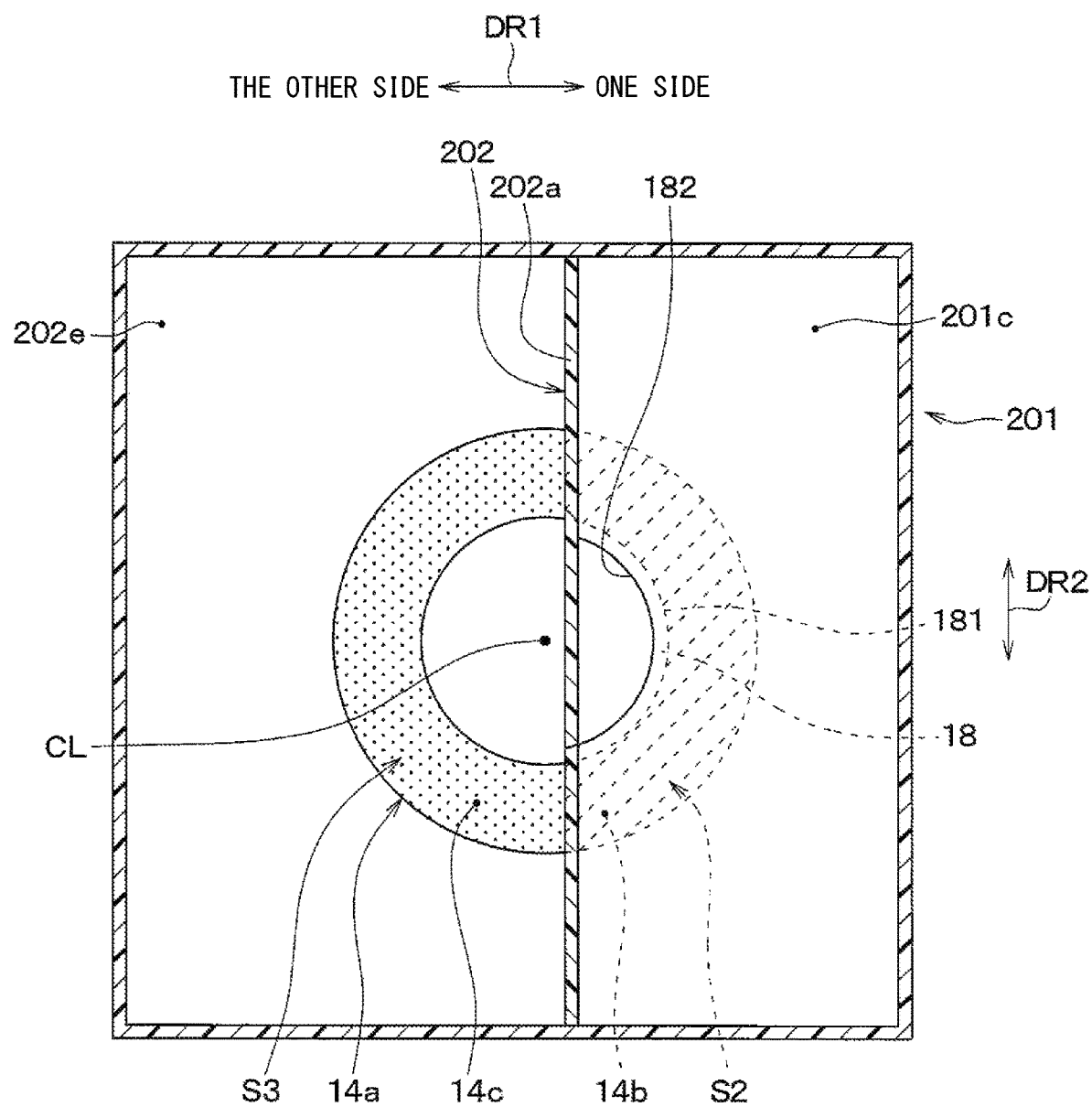
FIG. 6 is a cross-sectional view showing a centrifugal blower according to a second embodiment, corresponding to FIG. 4.

As shown in FIG. 6, in the present embodiment, the first partition wall 202a of the space division portion 202 is deviated to the one side in the first radial direction DR1 as compared with that of the first embodiment. Therefore, the relationship "S3>S2" is satisfied for the second area S2 and the third area S3.

The second area S2 is a projected area obtained by projecting the outer overlapping portion 14b of the suction port 14a in the axial direction DRa, as in the first embodiment. The third area S3 is subjected to the point hatching in FIG. 6. That is, the third area S3 is a projected area obtained by projecting the outer non-overlapping portion 14c of the suction port 14a in the axial direction DRa. More specifically, the third area S3 is a projected area obtained by projecting the outer non-overlapping portion 14c in the axial direction DRa with respect to the virtual plane whose normal direction is the axial direction DRa. According to the present embodiment, the relationship "S3>S2" is satisfied when the second area is S2 and the third area obtained by projecting the outer non-overlapping portion 14c of the suction port 14a in the axial direction DRa is S3. Therefore, the proportion of the outer non-overlapping portion 14c that does not overlap with the space division portion 202 in the axial direction DRa is increased, as compared with a case where the relationship "S3<S2" is satisfied, relative to the outer overlapping portion 14b and the outer non-overlapping portion 14c of the suction port 14a.

Therefore, when the outer overlapping portion 14b and the outer non-overlapping portion 14c are viewed as a whole, the outer air easily flows into the suction port 14a, so that the pressure loss when the outer air is sucked into the suction port 14a can be reduced.

Aside from the above described aspects, the present embodiment is the same as the first embodiment. Further, in the present embodiment, the same effects as the first embodiment described above can be obtained in the same manner as in the first embodiment.

Third Embodiment

A third embodiment is described next. The present embodiment will be explained mainly with respect to portions different from those of the first embodiment.

Figure 7:
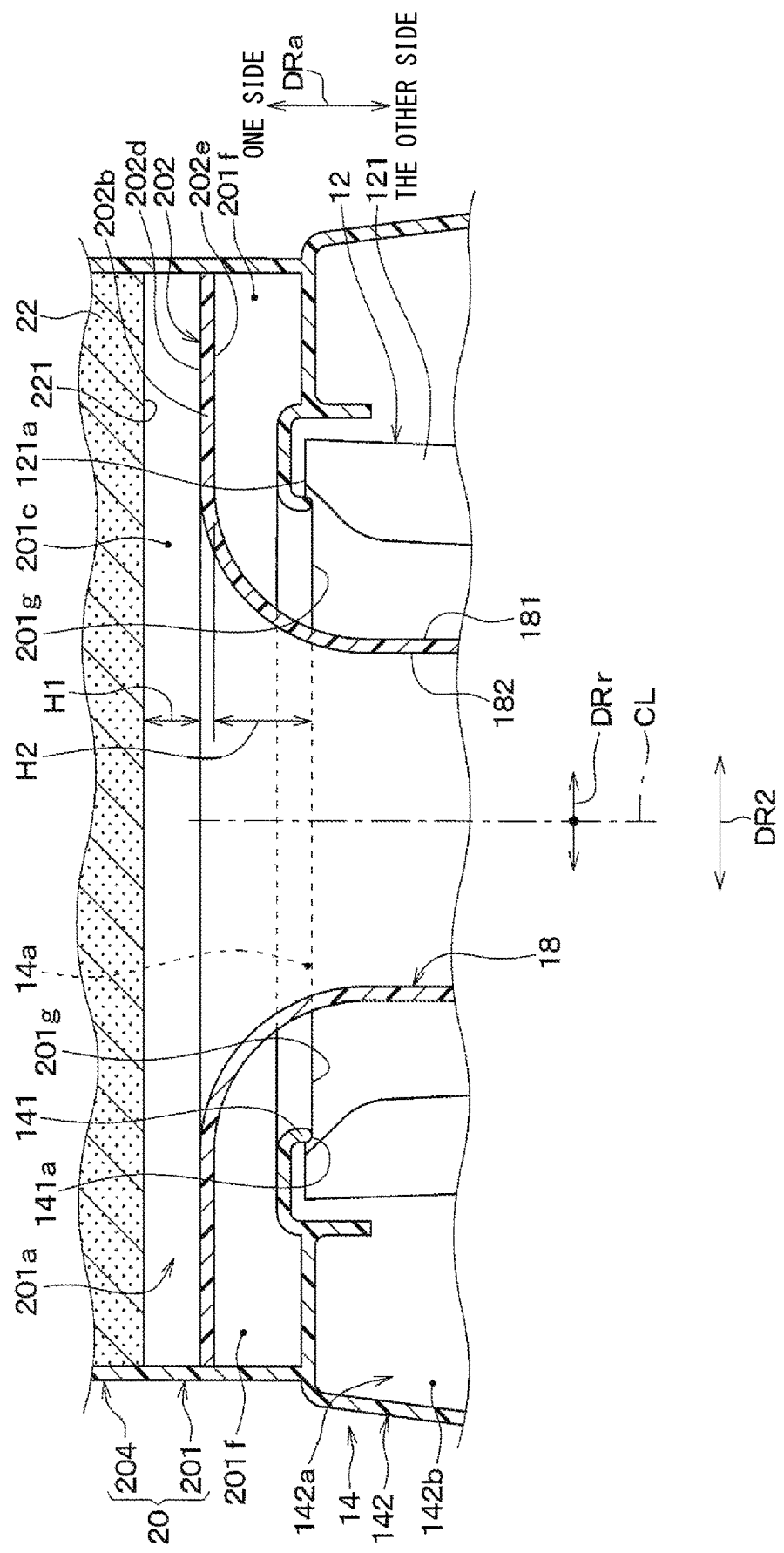
FIG. 7 is an enlarged view showing a centrifugal blower according to a third embodiment, corresponding to FIG. 3.

As shown in FIG. 7, in the present embodiment, the second partition wall 202b of the space division portion 202 is shifted to the one side in the axial direction DRa as compared with that of the first embodiment. Specifically, the distance H2 from the other end 141a of the bell mouth 141 in the axial direction DRa to the other side surface 202e is larger than the distance H1 from the filter downstream surface 221 to the one side surface 202d in the axial direction DRa.

Therefore, it is possible for the outer air to easily flow from the non-overlapping space 201e to the outer overlapping portion 14b of the suction port 14a via the overlapping space 201d within the limited height of the upstream space 201a in the axial direction DRa. Even if the distance H1 from the filter downstream surface 221 to the one side surface 202d in the axial direction DRa is reduced, it has almost no effect on the volume of the inner air since the flow path for the inner air is only narrowed at the end of the filter 22.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the second embodiment.

Fourth Embodiment

A fourth embodiment is described next. The present embodiment will be explained mainly with respect to portions different from those of the first embodiment.

Figure 8:
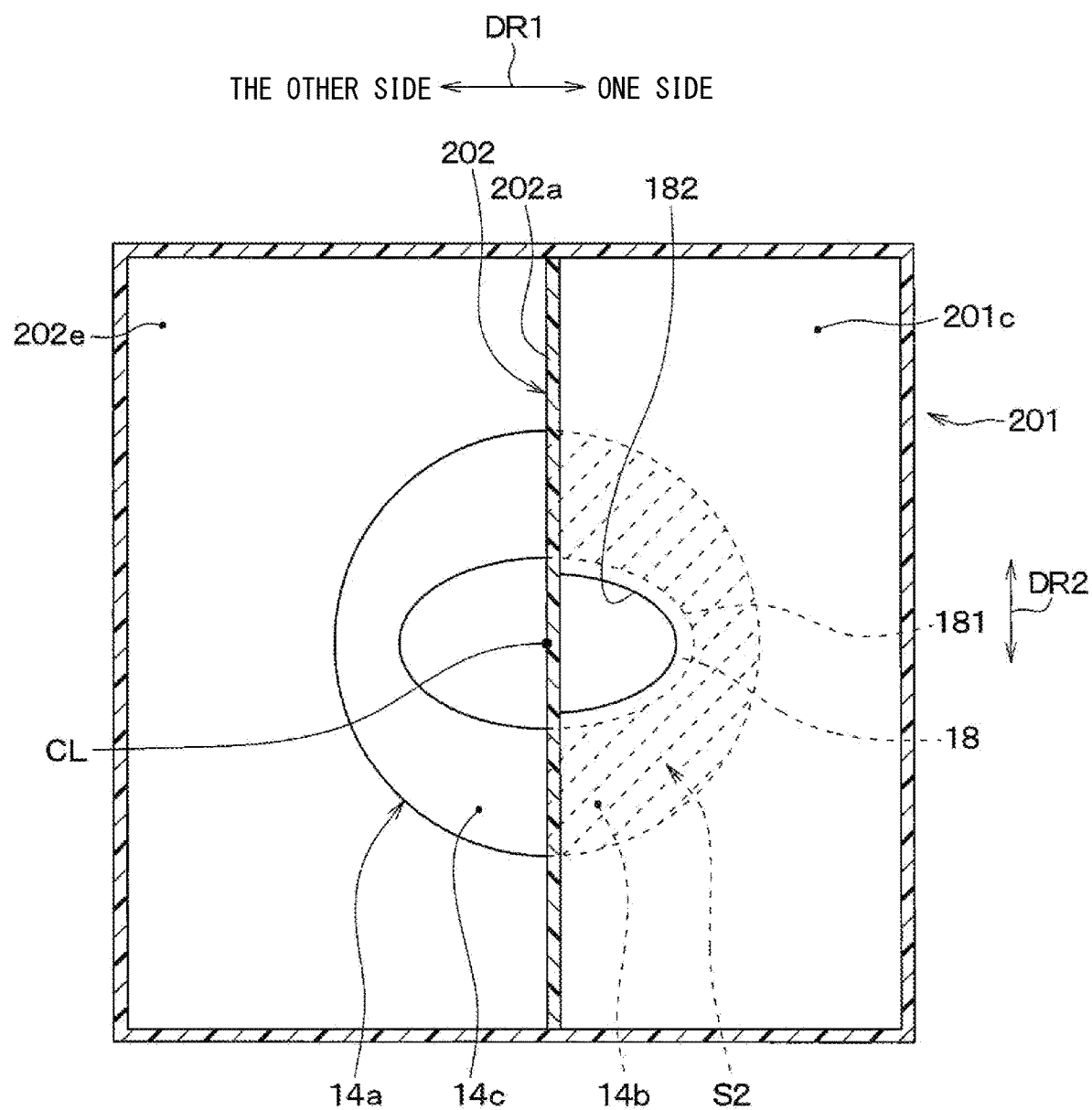
FIG. 8 is a cross-sectional view showing a centrifugal blower according to a fourth embodiment, corresponding to FIG. 4.

As shown in FIG. 8, in the present embodiment, the cross-sectional shape of the separation cylinder 18 taken along a virtual plane orthogonal to the fan axis CL is different from that of the first embodiment.

Specifically, the cross-sectional shape of the separation cylinder 18 taken along a virtual plane orthogonal to the fan axis CL at an intersecting portion 183 (see FIG. 3) of the separation cylinder 18 that crosses the suction port 14a is elongated in the first radial direction DR1, compared with a circular shape. For example, the cross-sectional shape at the intersecting portion 183 is an oval shape having the major axis direction in the first radial direction DR1.

As a result, it is possible to increase the first area S1 of FIG. 3 while maintaining the second area S2 of FIG. 8. Therefore, it is easy to increase "S1/S2", which is the ratio of the first area S1 to the second area S2 while the height of the upstream space 201a in the axial direction DRa is restricted.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the second embodiment or the third embodiment.

Other Embodiments (1) In each of the embodiments, for example, as shown in FIG. 1, the centrifugal fan 12 is a sirocco fan, but is not limited to this. For example, a turbo fan may be used. Further, the airfoil of the blade one side portion 121c and the airfoil of the blade other side portion 121d do not have to be the same, and their airfoils may be different from each other.

(2) In each of the embodiments, the blower 10 is applied to an air conditioner for a vehicle having a two-layer flow of inside and outside air, but the use of the blower 10 is not limited. For example, the blower 10 may be used for applications other than the air conditioner for a vehicle.

(3) In each of the embodiments, as shown in FIG. 1, the blower 10 has the filter 22, but the filter 22 is not essential.

(4) In each of the embodiments, as shown in FIG. 1, the number of inside/outside air doors 24 provided in the filter upstream space 204a is one, but plural inside/outside air doors 24 may be provided.

(5) In each of the embodiments, as shown in FIG. 1, the inside/outside air door 24 is a flat plate door, but the shape of the door is not limited. The inside/outside air door 24 may be a rotary door or a butterfly door.

(6) In each of the embodiments, as shown in FIG. 1, the separation cylinder 18 is fixed to, for example, the space division portion 202 of the upstream casing 20, but may be fixed to the fan casing 14.

(7) Note that the present disclosure is not limited to the embodiments, and can be variously modified. The above embodiments can be appropriately combined, since they not independent of each other, except when the combination is obviously impossible.

Further, in each of the embodiments, it goes without saying that components of the embodiment are not necessarily essential except for a case in which the components are particularly clearly specified as essential components, a case in which the components are clearly considered in principle as essential components, and the like.

Further, in each of the embodiments, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Further, in each of the embodiments, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

(Overview)

According to the first aspect shown in part or all of the above embodiments, the separation cylinder separates the air that passes through the suction port and heads between the blades into the inner air that flows inside the separation cylinder in the radial direction and the outer air that flows outside the separation cylinder in the radial direction, to be guided between the blades. The upstream space forming portion has the space division portion that divides the upstream space into an inner connection space through which the inner air flows and an outer connection space through which the outer air flows. The inner connection space is biased to one side in one radial direction, which is one of the radial directions of the upstream space. The outer connection space has an overlapping space that overlaps the other side of the space division portion opposite to the one side in the axial direction, and a non-overlapping space excluding the overlapping space from the outer connection space. The non-overlapping space is located on the other side opposite to the one side in the one radial direction relative to the inner connection space and the overlapping space. A relationship "S1/S2≥0.5" is satisfied when a first area defined by projecting a boundary between the overlapping space and the non-overlapping space in the one radial direction is S1, and when a second area defined by projecting the outer overlapping portion of the suction port in the axial direction is S2.

According to the second aspect, in a projected shape in which the boundary is projected in the one radial direction, a connection portion of the boundary connected to the suction port has a connection width in an orthogonal direction orthogonal to the one radial direction and the axial direction, and the connection width is smaller than a non-connection width obtained by subtracting the connection width from a width of the projected shape in the orthogonal direction.

Moreover, the third aspect is the same as the second aspect.

Further, according to the fourth aspect, when the second area is S2 and the third area obtained by projecting the outer non-overlapping portion of the suction port in the axial direction is S3, the relationship of "S3>S2" is satisfied. Therefore, the proportion of the outer non-overlapping portion that does not overlap with the space division portion in the axial direction is increased as compared with a case where the relationship "S3<S2" is satisfied, relative to the outer overlapping portion and the outer non-overlapping portion of the suction port. Thus, when the outer overlapping portion and the outer non-overlapping portion are viewed as a whole, the outer air easily flows into the suction port, so that the pressure loss when the outer air is sucked into the suction port can be reduced.

Moreover, the fifth aspect is the same as this fourth aspect.

Further, according to the sixth aspect, a filter is arranged upstream of the upstream space in a flow of air. The filter has a filter downstream surface facing the non-overlapping space and the inner connection space from the one side in the axial direction. The space division portion has one side surface facing the inner connection space on the one side in the axial direction, and the other side surface facing the overlapping space on the other side in the axial direction. The fan casing has a suction port peripheral portion that surrounds the suction port to form the suction port inside. The suction port peripheral portion has the other end on the other side in the axial direction. A distance from the other end of the suction port peripheral portion to the other side surface of the space division portion in the axial direction is larger than a distance from the filter downstream surface to the one side surface of the space division portion in the axial direction. Therefore, within the limited height of the upstream space in the axial direction, it is possible to facilitate the flow of outer air from the non-overlapping space through the overlapping space to the outer overlapping portion of the suction port. Even if the distance from the downstream surface of the filter to the one surface of the division portion in the axial direction is reduced, the flow path for the inner air is only narrowed at the end of the filter, so that the air volume of the inner air is hardly affected.

According to the seventh aspect, the cross-sectional shape of the separation cylinder taken along a a virtual plane orthogonal to the fan axis at the portion of the separation cylinder that crosses the suction port is elongated in the one radial direction as compared with a circular shape. As a result, it is possible to expand the first area while maintaining the second area. Therefore, it is easy to increase the area ratio "S1/S2" while the height of the upstream space is limited in the axial direction.

What is claimed is:

1. A centrifugal blower comprising:
a centrifugal fan having a plurality of blades arranged around a fan axis to rotate around the fan axis so as to suck air from one side in an axial direction and blow outward in a radial direction;
a fan casing that houses the centrifugal fan, the fan casing having a suction port arranged on the one side of the centrifugal fan in the axial direction, the air passing through the suction port to be sucked into the centrifugal fan;
a separation cylinder arranged inside the plurality of blades in the radial direction, the separation cylinder having a cylindrical shape extending in the axial direction through the suction port; and
an upstream space forming portion provided upstream of the suction port in a flow of the air, in which an upstream space is formed for the air flowing toward the suction port, wherein
the separation cylinder separates and guides the air passing through the suction port and heading between the plurality of blades into an inner air of the respective air flowing inside the separation cylinder in the radial direction and an outer air of the repsective air flowing outside the separation cylinder in the radial direction,
the upstream space forming portion has a space division portion that divides the upstream space into an inner connection space through which the inner air flows and an outer connection space through which the outer air flows,
the inner connection space is biased on one side in one radial direction, which is one of the radial directions, in the upstream space,
the outer connection space has an overlapping space that overlaps the space division portion at an other side opposite to the one side in the axial direction, and a non-overlapping space excluding the overlapping space from the outer connection space, the non-overlapping space being located on the other side opposite to the one side in the one radial direction relative to the inner connection space and the overlapping space,
the suction port has an outer overlapping portion located outside the separation cylinder in the radial direction and overlapping the other side of the space division portion in the axial direction, and an outer non-overlapping portion excluding the outer overlapping portion from the suction port located outside the separation cylinder in the radial direction,
the non-overlapping space is connected to the outer non-overlapping portion and is connected to the outer overlapping portion via the overlapping space, and
a relationship $S1/S2 \geq 0.5$ is satisfied when a first area defined by projecting a boundary between the overlapping space and the non-overlapping space in the one radial direction is S1 and when a second area defined by projecting the outer overlapping portion of the suction port in the axial direction is S2.

2. The centrifugal blower according to claim 1, wherein in a projected shape in which the boundary is projected in the one radial direction,
a connection portion of the boundary connected to the suction port has a connection width in an orthogonal direction orthogonal to the one radial direction and the axial direction, and
the connection width is smaller than a non-connection width obtained by subtracting the connection width from a width of the projected shape in the orthogonal direction.

3. A centrifugal blower comprising:
a centrifugal fan having a plurality of blades arranged around a fan axis to rotate around the fan axis so as to suck air from one side in an axial direction and blow outward in a radial direction;
a fan casing that houses the centrifugal fan, the fan casing having a suction port arranged on the one side of the centrifugal fan in the axial direction, the air passing through the suction port to be sucked into the centrifugal fan;

a separation cylinder arranged inside the plurality of blades in the radial direction, the separation cylinder having a cylindrical shape extending in the axial direction through the suction port; and an upstream space forming portion provided upstream of the suction port in a flow of the air flow, in which an upstream space is formed for the air flowing toward the suction port, wherein the separation cylinder separates and guides the air passing through the suction port and heading between the plurality of blades into an inner air of the respective air flowing inside the separation cylinder in the radial direction and an outer air of the respective air flowing outside the separation cylinder in the radial direction, the upstream space forming portion has a space division portion that divides the upstream space into an inner connection space through which the inner air flows and an outer connection space through which the outer air flows, the inner connection space is biased on one side in one radial direction, which is one of the radial direction, in the upstream space, the outer connection space has an overlapping space that overlaps the space division portion at an other side opposite to the one side in the axial direction, and a non-overlapping space excluding the overlapping space from the outer connection space, the non-overlapping space being located on the other side opposite to the one side in the one radial direction relative to the inner connection space and the overlapping space, the suction port has an outer overlapping portion located outside the separation cylinder in the radial direction and overlapping the other side of the space division portion in the axial direction, and an outer non-overlapping portion excluding the outer overlapping portion from the suction port located outside the separation cylinder in the radial direction, the non-overlapping space is connected to the outer non-overlapping portion and is connected to the outer overlapping portion via the overlapping space, in a projected shape in which a boundary between the overlapping space and the non-overlapping space is projected in the one radial direction, a connection portion of the boundary connected to the suction port has a connection width in an orthogonal direction orthogonal to the one radial direction and the axial direction, and the connection width is smaller than a non-connection width obtained by subtracting the connection width from a width of the projected shape in the orthogonal direction.

4. The centrifugal blower according to claim 1, wherein a relationship S3>S2 is satisfied when a third area defined by projecting the outer non-overlapping portion of the suction port in the axial direction is S3.

5. The centrifugal blower according to claim 3, wherein a relationship S3>S2 is satisfied when a second area defined by projecting the outer overlapping portion of the suction port in the axial direction is S2 and when a third area defined by projecting the outer non-overlapping portion of the suction port in the axial direction is S3.

6. The centrifugal blower according to claim 1 further comprising: a filter arranged upstream of the upstream space in a flow of air, wherein the filter has a filter downstream surface facing the non-overlapping space and the inner connection space from the one side in the axial direction, the space division portion has one side surface facing the inner connection space on the one side in the axial direction, and the other side surface facing the overlapping space on the other side in the axial direction, the fan casing has a suction port peripheral portion that surrounds the suction port to form the suction port inside, the suction port peripheral portion has the other end on the other side in the axial direction, and a distance from the other end of the suction port peripheral portion to the other side surface of the space division portion in the axial direction is larger than a distance from the filter downstream surface to the one side surface of the space division portion in the axial direction.

7. The centrifugal blower according to claim 1, wherein the separation cylinder has an intersecting portion across the suction port, and a cross-sectional shape of the intersecting portion of the separation cylinder taken along a virtual plane orthogonal to the fan axis has an oblong shape extended in the one radial direction compared with a circular shape.

* * * * *